United States Patent
Nakamura et al.

(10) Patent No.: US 11,635,618 B2
(45) Date of Patent: Apr. 25, 2023

(54) OPTICAL ELEMENT, DISPLAY SYSTEM, AND MOBILE OBJECT

(71) Applicant: RICOH COMPANY, LTD., Tokyo (JP)

(72) Inventors: Kento Nakamura, Kanagawa (JP); Shimpei Ogino, Kanagawa (JP); Yuuki Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 431 days.

(21) Appl. No.: 16/966,706

(22) PCT Filed: Apr. 15, 2019

(86) PCT No.: PCT/JP2019/016181
§ 371 (c)(1),
(2) Date: Jul. 31, 2020

(87) PCT Pub. No.: WO2019/220834
PCT Pub. Date: Nov. 21, 2019

(65) Prior Publication Data
US 2021/0033861 A1      Feb. 4, 2021

(30) Foreign Application Priority Data

May 14, 2018    (JP) .............................. JP2018-092842

(51) Int. Cl.
*G02B 26/08*      (2006.01)
*G02B 27/01*      (2006.01)
(Continued)

(52) U.S. Cl.
CPC .......... *G02B 27/0101* (2013.01); *B60K 35/00* (2013.01); *G02B 3/0056* (2013.01);
(Continued)

(58) Field of Classification Search
CPC .............. G02B 27/0101; G02B 3/0056; G02B 26/0833; G02B 26/101; G02B 3/0006;
(Continued)

(56) References Cited

U.S. PATENT DOCUMENTS

2009/0160736 A1    6/2009    Shikita
2013/0050655 A1    2/2013    Fujikawa et al.
(Continued)

FOREIGN PATENT DOCUMENTS

EP       2 944 986 A1       11/2015
JP       2009-150947 A       7/2009
(Continued)

OTHER PUBLICATIONS

International Search Report and Written Opinion dated Jul. 23, 2019 in PCT/JP2019/016181 filed on Apr. 15, 2019.
(Continued)

*Primary Examiner* — Euncha P Cherry
(74) *Attorney, Agent, or Firm* — Xsensus LLP

(57) ABSTRACT

A display system includes an optical element through which light diverges and an imaging optical system configured to form an image by projecting diverging light diverging through the optical element. In the display system, the image formed by the imaging optical system is visually recognized by a viewer, and a condition in an equation tan $\theta \geq (T \times B)/(S \times O)$ is satisfied, where $\theta$ denotes a divergence angle of the optical element, T denotes distance between the image forming optical system and the formed image, B denotes a range of an eye box that is an area through which the formed image can visually be recognized, S denotes distance
(Continued)

between the formed image and a viewpoint of the viewer of the formed image, and O denotes distance between the optical element and the image forming optical system. In the above equation, each distance indicates length of an optical path that passes through a center of an image formed by the light when an object is observed from a reference eyepoint.

9 Claims, 15 Drawing Sheets

(51) Int. Cl.
   *B60K 35/00* (2006.01)
   *G02B 3/00* (2006.01)
   *G02B 26/10* (2006.01)
(52) U.S. Cl.
   CPC ....... *G02B 26/0833* (2013.01); *G02B 26/101* (2013.01); *B60K 2370/1529* (2019.05); *B60K 2370/166* (2019.05); *B60K 2370/167* (2019.05); *B60K 2370/168* (2019.05); *B60K 2370/23* (2019.05)
(58) Field of Classification Search
   CPC .................... G02B 26/10; B60K 35/00; B60K 2370/1529; B60K 2370/166; B60K 2370/167; B60K 2370/168; B60K 2370/23; H04N 9/3129
   See application file for complete search history.

(56) References Cited

U.S. PATENT DOCUMENTS

| | | |
|---|---|---|
| 2015/0219803 A1 | 8/2015 | Inamoto et al. |
| 2016/0116735 A1 | 4/2016 | Hayashi et al. |
| 2016/0320615 A1 | 11/2016 | Nakamura et al. |
| 2017/0285341 A1* | 10/2017 | Nakagawa ......... G02B 27/0101 |
| 2019/0346677 A1 | 11/2019 | Tanabe et al. |

FOREIGN PATENT DOCUMENTS

| | | |
|---|---|---|
| JP | 2015-145962 | 8/2015 |
| JP | 2015-232693 | 12/2015 |
| JP | 2016-136222 | 7/2016 |
| JP | 2016-206563 | 12/2016 |
| JP | 2017-021131 A | 1/2017 |
| JP | 2017-120371 | 7/2017 |
| JP | 2018-156061 | 10/2018 |
| JP | 2018-156062 | 10/2018 |
| WO | 2016/035607 A1 | 3/2016 |

OTHER PUBLICATIONS

Office Action dated Nov. 3, 2022 in European Patent Application No. 19 719 630.6, 6 pages.
Office Action dated Dec. 7, 2021 in Japanese Patent Application No. 2018-092842, 3 pages.

* cited by examiner

OPTICAL ELEMENT, DISPLAY SYSTEM, AND MOBILE OBJECT

TECHNICAL FIELD

Embodiments of the present disclosure relate to an optical element, a display system, and a mobile object.

BACKGROUND ART

Display devices such as a heads-up display (HUD) are used as an application in a mobile object such as a vehicle that allows a driver (viewer) to recognize various kinds of information (for example, vehicle information, navigation information, and warning information) with a reduced amount of movement in line of vision.

For example, PTL 1 discloses an image display apparatus that uses an optical scanner to scan the image light emitted from a light source two-dimensionally in the main scanning direction and the sub-scanning direction and forms an intermediate image on a light dispersing member. The image display apparatus disclosed in PTL 1 then projects the magnified intermediate image to a to-be-projected member such as the front windshield of a vehicle, such that an image (virtual image) is superimposed in the viewing field of a viewer.

CITATION LIST

Patent Literature

PTL 1: Japanese Patent Application Publication No. 2015-232693

SUMMARY OF INVENTION

Technical Problem

An optical element, a display system, and a mobile object in which variations in brightness can be reduced when the viewer moves his/her location of the eyepoint are to be provided.

Solution to Problem

A display system includes an optical element through which light diverges and an imaging optical system configured to form an image by projecting diverging light diverging through the optical element. In the display system, the image formed by the imaging optical system is visually recognized by the viewer, and a condition in an equation $\tan \theta \geq (T \times B)/(S \times O)$ is satisfied, where $\theta$ denotes a divergence angle of the optical element, T denotes distance between the image forming optical system and the formed image, B denotes a range of an eye box that is an area through which the formed image can visually be recognized, S denotes distance between the formed image and a viewpoint of the viewer of the formed image, and O denotes distance between the optical element and the image forming optical system. In the above equation, each distance indicates length of an optical path that passes through a center of an image formed by the light when an object is observed from a reference eyepoint.

Advantageous Effects of Invention

According to one aspect of the present disclosure, when the viewer moves his/her location of the eyepoint, variations in brightness when the viewer moves his/her location of the eyepoint can be reduced.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Embodiments of the present disclosure are described below with reference to the accompanying drawings. In the description of the drawings, like reference signs denote like elements, and overlapping descriptions are omitted.

Embodiments

System Configuration

Figure 1:
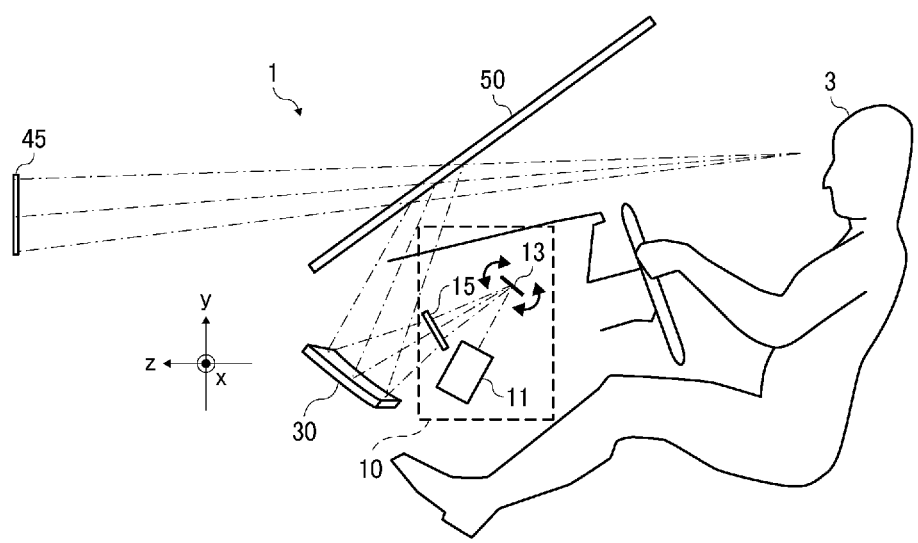
FIG. 1 is a diagram illustrating a system configuration of a display system according to an embodiment of the present disclosure.

FIG. 1 is a diagram illustrating a system configuration of a display system 1 according to an embodiment of the present disclosure. The display system 1 as illustrated in FIG. 1 can prevent reduction in brightness at the edge of an image (i.e., a virtual image 45) that is visually recognized by a viewer 3 and reduction in brightness when the viewer 3 moves his/her location of the eyepoint, and enable the viewer 3 to visually recognize an image with a sufficient brightness distribution.

In the display system 1, the viewer 3 can visually identify a display image as the projection light that is projected from a display device 10 is projected onto a transmissive reflector. The display image is an image superimposed on the viewing field of the viewer 3 as the virtual image 45. For example, the display system 1 is provided for a mobile object such as a vehicle, an aircraft, and a ship, or an immobile object such as a maneuvering simulation system, and a home-theater system. In the present embodiment, cases in which the display system 1 is provided for a vehicle as an example of the mobile object is described. However, no limitation is intended thereby, and the type of usage of the display system 1 is not limited to the present embodiment.

For example, the display system 1 is mounted in a vehicle, and makes navigation information visible to the viewer 3 (i.e., the driver) through a front windshield 50 of the vehicle. The navigation information includes, for example, the information about the speed of the vehicle, the course information, the distance to a destination, the name of the current place, the presence or position of an object ahead of the vehicle, a traffic sign indicating, for example, speed limit, and traffic congestion, and aids the driving of the vehicle. In this configuration, the front windshield 50 serves as a transmissive reflector that transmits some of the incident light and reflects at least some of the remaining incident light. The distance between the location of the eyepoint of the viewer 3 and the front windshield 50 is about several tens of centimeters (cm) to one meter (m).

In the display system 1, includes a display device 10, a free-form surface mirror 30, and a front windshield 50. For example, the display device 10, is a heads-up display (HUD) provided for a vehicle as an example of the mobile object. In the display device 10, may be arranged at any desired position in conformity with the interior design of the vehicle. For example, the display device 10 according to the present embodiment may be disposed under the dashboard of the vehicle or built into the dashboard of the vehicle.

In the display device 10, includes a light-source device 11, a light deflector 13, and a screen 15. The light-source device 11 is a device that emits the laser beams emitted from a light source outside the device. For example, the light-source device 11 may emit laser beams in which three-color laser beams of red, green, and blue (RGB) are combined. The laser beams emitted from the light-source device 11 are guided to the reflection plane of the light deflector 13. For example, the light-source device 11 has a semiconductor light-emitting element such as a laser diode (LD) that serves as a light source. However, no limitation is intended thereby, and the light source may be a semiconductor light-emitting element such as a light-emitting diode (LED).

The light deflector 13 scans the light beams that are emitted from the light-source device 11 in the main scanning direction and the sub-scanning direction orthogonal to the main scanning direction to form an intermediate image on the screen 15 that serves as an optical element, and uses, for example, a micro-electromechanical systems (MEMS) to change the directions of travel of the laser beams. For example, the light deflector 13 is configured by a scanner a mirror system composed of one minute MEMS mirror that pivots around two axes orthogonal to each other or two MEMS mirrors that pivot or rotates around one axis. The laser beams that are emitted from the light deflector 13 scan the screen 15. The light deflector 13 is not limited to a MEMS mirror, but may be configured by a polygon mirror or the like.

The screen 15 is an optical element through which light diverges, and serves as a divergent part through which laser beams diverge at a predetermined divergence angle. For example, the screen 15 may consist of an exit pupil expander (EPE), and may be configured by a transmissive optical element such as a microlens array (MLA) or diffuser panel that diffuses light. Alternatively, the screen 15 may be configured by a reflective optical element such as a micromirror array that diffuses light. The screen 15 forms a two-dimensional intermediate image 40 on the screen 15 as the laser beams emitted from the light deflector 13 scan the surface of the screen 15.

A method of projecting an image using the display device 10 may be implemented by a panel system or a laser scanning system. In the panel system, the intermediate image 40 is formed by an imaging device such as a liquid crystal panel, a digital micromirror device (DMD) panel (digital mirror device panel), or a vacuum fluorescent display (VFD). In the laser scanning system, the intermediate image 40 is formed by scanning the laser beams emitted from the light-source device 11, using an optical scanner.

The display device 10 according to the present embodiment adopts the laser scanning system. In particular, in the laser scanning system, since emitting/non-emitting can be assigned to each pixel, in general, a high-contrast image can be formed. In some alternative embodiments, the above-described panel system may be adopted as the projection system in the display device 10.

The virtual image 45 is projected onto the free-form surface mirror 30 and the front windshield 50 as the intermediate image 40 that is formed by the laser beams (bundle of laser beams) emitted from the screen 15 is magnified for view. The free-form surface mirror 30 is designed and arranged so as to cancel, for example, the inclination of the image, the distortion of the image, and the displacements of the image, which are caused by the bent shape of the front windshield 50. The free-form surface mirror 30 may be arranged in a pivotable manner around the rotation axis. Due to such a configuration, the free-form surface mirror 30 can adjust the reflection direction of the laser beams (bundle of laser beams) emitted from the screen 15 to change the position at which the virtual image 45 is displayed.

In the present embodiment, the free-form surface mirror 30 is designed using a commercially available optical design simulation software such that the free-form surface mirror 30 has a certain level of light-gathering power to achieve a desired image-forming position of the virtual image 45. In the display device 10, the light-gathering power of the free-form surface mirror 30 is designed such that the virtual image 45 is displayed at a position away from the location of the eyepoint of the viewer 3 in the depth direction by, for example, at least 1 m and equal to or shorter than 30 m (preferably, equal to or shorter than 10 m). The free-form surface mirror 30 may be a concave mirror or a curved-surface mirror. The free-form surface mirror 30 is an example of an image forming optical system that forms an image by projecting the diverging light diverging through the optical element.

The front windshield 50 serves as a transmissive reflector that transmits some of the laser beams (bundle of laser beams) and reflects at least some of the remaining laser beams (partial reflection). The front windshield 50 may serve as a semitransparent mirror through which the viewer 3 visually recognizes the virtual image 45 and the scenery ahead of the mobile object (vehicle). The virtual image 45 is an image that is visually recognized by the viewer 3, including vehicle-related information (e.g., speed and travel distance), navigation information (e.g., route guidance and traffic information), and warning information (e.g., collision warning). The transmissive reflector may be another front windshield arranged in addition to the front windshield 50. The front windshield 50 is an example of a reflector.

The virtual image 45 may be displayed so as to be superimposed on the scenery ahead of the front windshield 50. The front windshield 50 is not flat but is curved. For this reason, the position at which the virtual image 45 is formed is determined by the curved surface of the free-form surface mirror 30 and the front windshield 50. In some embodiments, the front windshield 50 may be a semitransparent mirror (combiner) that serves as a separate transmissive having a reflector partial reflection function.

Due to such a configuration as above, the laser beams (bundle of laser beams) emitted from the screen 15 are projected towards the free-form surface mirror 30, and are reflected by the front windshield 50. Accordingly, the viewer 3 can visually recognize the virtual image 45, i.e., the magnified image of the intermediate image 40 formed on the screen 15, due to the light reflected by the front windshield 50.

Hardware Configuration

Figure 2:
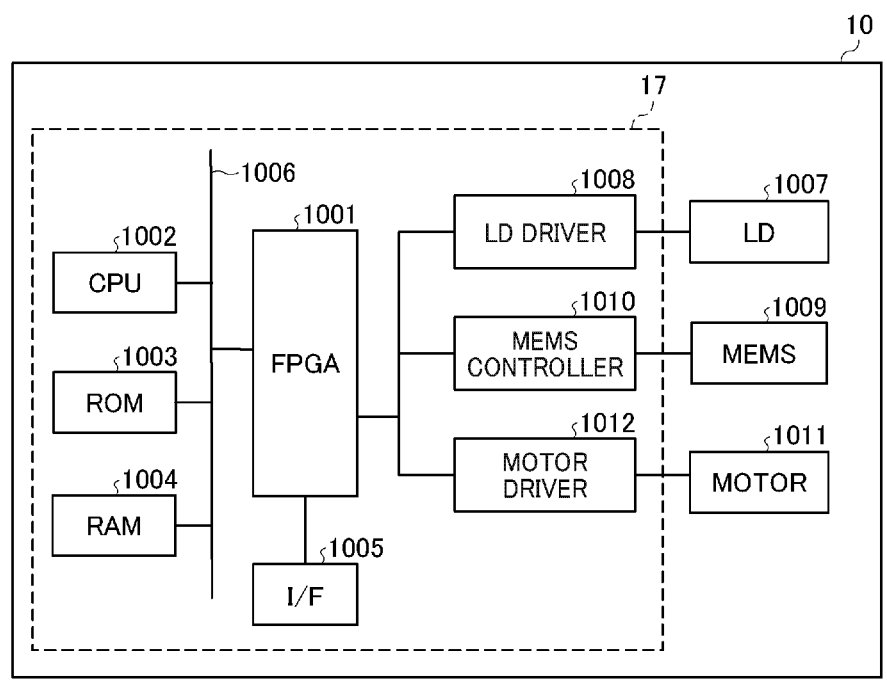
FIG. 2 is a diagram illustrating a hardware configuration of a display device according to an embodiment of the present disclosure.

FIG. 2 is a diagram illustrating a hardware configuration of a display device according to the present embodiment. The hardware configuration illustrated in FIG. 2 may be adopted in common among the embodiments of the present disclosure. Alternatively, some components or elements may be added to or deleted from the hardware configuration of FIG. 2.

The display device 10 includes a controller 17 that controls the operation of the display device 10. For example, the controller 17 is a circuit board or integrated circuit (IC) chip mounted inside the display device 10. The controller 17 includes a field-programmable gate array (FPGA) 1001, a central processing unit (CPU) 1002, a read only memory (ROM) 1003, a random access memory (RAM) 1004, an interface (I/F) 1005, a data bus line 1006, a laser diode (LD) driver 1008, a micro-electromechanical systems (MEMS) controller 1010, and a motor driver 1012.

The FPGA 1001 is an integrated circuit that is configurable by the designer of the display device 10. The LD driver 1008, the MEMS controller 1010, and the motor driver 1012 generate a driving signal according to the control signal output from the FPGA 1001. The CPU 1002 is an integrated circuit that controls the entirety of the display device 10. The ROM 1003 is a storage device that stores a program for controlling the CPU 1002. The RAM 1004 is a storage device that serves as a work area of the CPU 1002. The interface 1005 communicates with an external device. For example, the interface 1005 is coupled to the controller area network (CAN) of a vehicle.

For example, the LD 1007 is a semiconductor light-emitting element that configures a part of the light-source device 11. The LD driver 1008 is a circuit that generates a driving signal for driving the LD 1007. The MEMS 1009 configures a part of the light deflector 13 and moves the scanning mirror. The MEMS controller 1010 is a circuit that generates a driving signal for driving the MEMS 1009. A motor 1011 is an electric motor that rotates the rotation axis of the free-form surface mirror 30. The motor driver 1012 is a circuit that generates a driving signal for driving the motor 1011.

Functional Configuration

Figure 3:
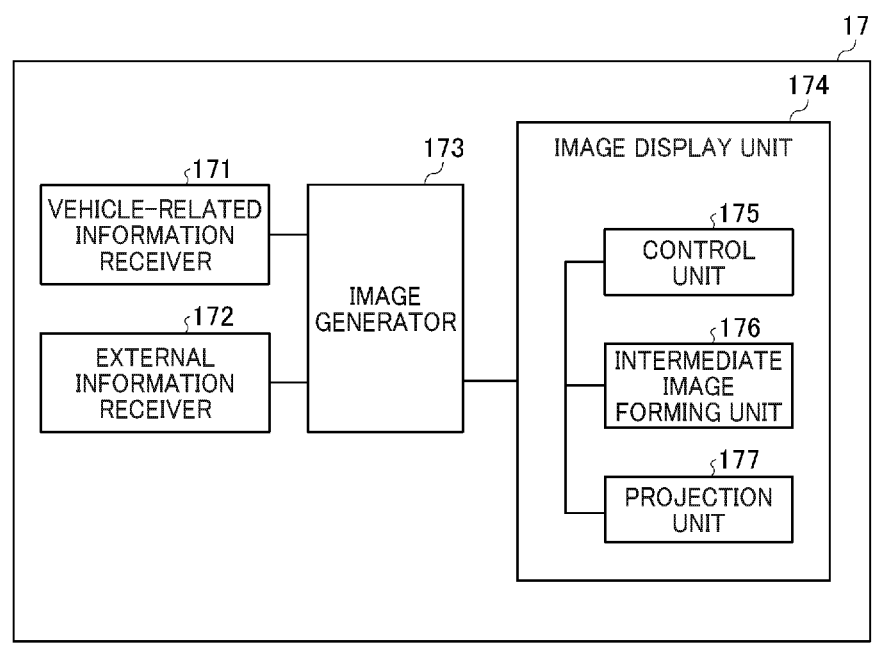
FIG. 3 is a diagram illustrating a functional configuration of a display device according to an embodiment of the present disclosure.

FIG. 3 is a diagram illustrating a functional configuration of the display device 10 according to the present embodiment. The functions that are implemented by the display device 10 include a vehicle-related information receiver 171, an external information receiver 172, an image generator 173, and an image display unit 174.

The vehicle-related information receiver 171 is a function to receive vehicle-related information (e.g., speed and travel distance) from a controller area network (CAN) or the like. For example, the vehicle-related information receiver 171 is implemented by some of the elements illustrated in FIG. 2. In particular, the vehicle-related information receiver 171 may be implemented by the interface 1005, the processing performed by the CPU 1002, and a program stored in the ROM 1003.

The external information receiver 172 receives external information (for example, position information from the global positioning system (GPS), routing information from a navigation system, and traffic information) of the vehicle from an external network. For example, the external information receiver 172 is implemented by some of the elements illustrated in FIG. 2. In particular, the external information receiver 172 may be implemented by the interface 1005, the processing performed by the CPU 1002, and a program stored in the ROM 1003.

The image generator 173 is a function to generate image data, which is used to display the intermediate image 40 and the virtual image 45, based on the data input from the vehicle-related information receiver 171 and the external information receiver 172. For example, the image generator 173 is implemented by some of the elements illustrated in FIG. 2. In particular, the image generator 173 may be implemented by the processing performed by the CPU 1002, and a program stored in the ROM 1003.

The image display unit 174 is a function to form the intermediate image 40 on the screen 15 based on the image data generated by the image generator 173, and to project the laser beams (bundle of laser beams) that form the intermediate image 40 towards the front windshield 50 to display the virtual image 45. For example, the image display unit 174 is implemented by some of the elements illustrated in FIG. 2. In particular, the image display unit 174 may be implemented by the processing performed by the CPU 1002, the FPGA 1001, the LD driver 1008, the MEMS controller 1010, and the motor driver 1012, as well as a program stored in the ROM 1003.

The image display unit 174 includes a control unit 175, an intermediate image forming unit 176, and a projection unit 177. In order to form the intermediate image 40, the control unit 175 generates a control signal used to control the operation of the light-source device 11 and the light deflector 13. Moreover, the control unit 175 generates a control signal that controls the operation of the free-form surface mirror 30 to display the virtual image 45 at a desired position.

The intermediate image forming unit 176 forms the intermediate image 40 on the screen 15 based on the control signal generated by the control unit 175. The projection unit 177 projects the laser beams that form the intermediate image 40 towards the transmissive reflector (e.g., the front windshield 50) in order to form the virtual image 45 to be visually recognized by the viewer 3.

Light-Source Device

Figure 4:
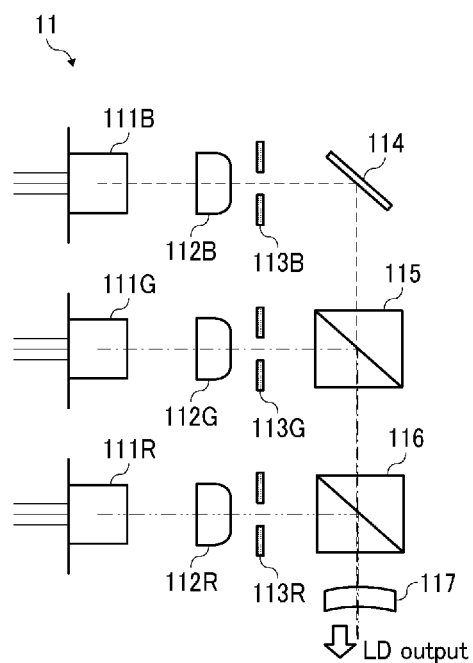
FIG. 4 is a diagram illustrating a specific configuration of a light-source device according to an embodiment of the present disclosure.

FIG. 4 is a diagram illustrating a specific configuration of the light-source device 11 according to the present embodiment. The light-source device 11 includes light-source elements 111R, 111G, and 111B (these light-source elements may be referred to simply as a light-source element 111 in the following description when it is not necessary to distinguish each of the light-source elements), coupling lenses 112R, 112G, and 112B, apertures 113R, 113G, and 113B, combiners 114, 115, and 116, and a lens 117.

For example, each of the light-source elements 111 R, 111 G, and 111B of three colors (R, G, B) of three colors (red, green, and blue (RGB)) is a laser diode (LD) having a single or a plurality of light-emitting points. The light-source elements 111R, 111G, and 111B emit bundles of laser beams (light flux) having different wavelengths $\lambda R$, $\lambda G$, and $\lambda B$, respectively. For example, $\lambda R$=640 nanometers (nm), $\lambda G$=530 nm, and $\lambda B$=445 nm.

The emitted bundles of laser beams (light flux) are coupled by the coupling lenses 112R, 112G, and 112B, respectively. The coupled laser beams (bundles of laser beams) are shaped by the apertures 113R, 113G, and 113B, respectively. The shape of the apertures 113R, 113G, and 113B may be various kinds of shape such as a circle, an ellipse, a rectangle, and a square depending on, for example, certain predetermined conditions such as the divergence angle of the bundles of laser beams (light flux).

The laser beams (light flux) that are shaped by the apertures 113R, 113G, and 113B are combined by the three combiners 114, 115, and 116, respectively. The combiners 114, 115, and 116 are plate-like or prismatic dichroic mirrors, and reflect or transmit the laser beams (light flux) therethrough according to the wavelength of the laser beams to combine the laser beams into one bundle of laser beams (light flux) that travels along one optical path. The combined bundle of laser beams passes through the lens 117 and is guided to the light deflector 13.

Light Deflector

Figure 5:
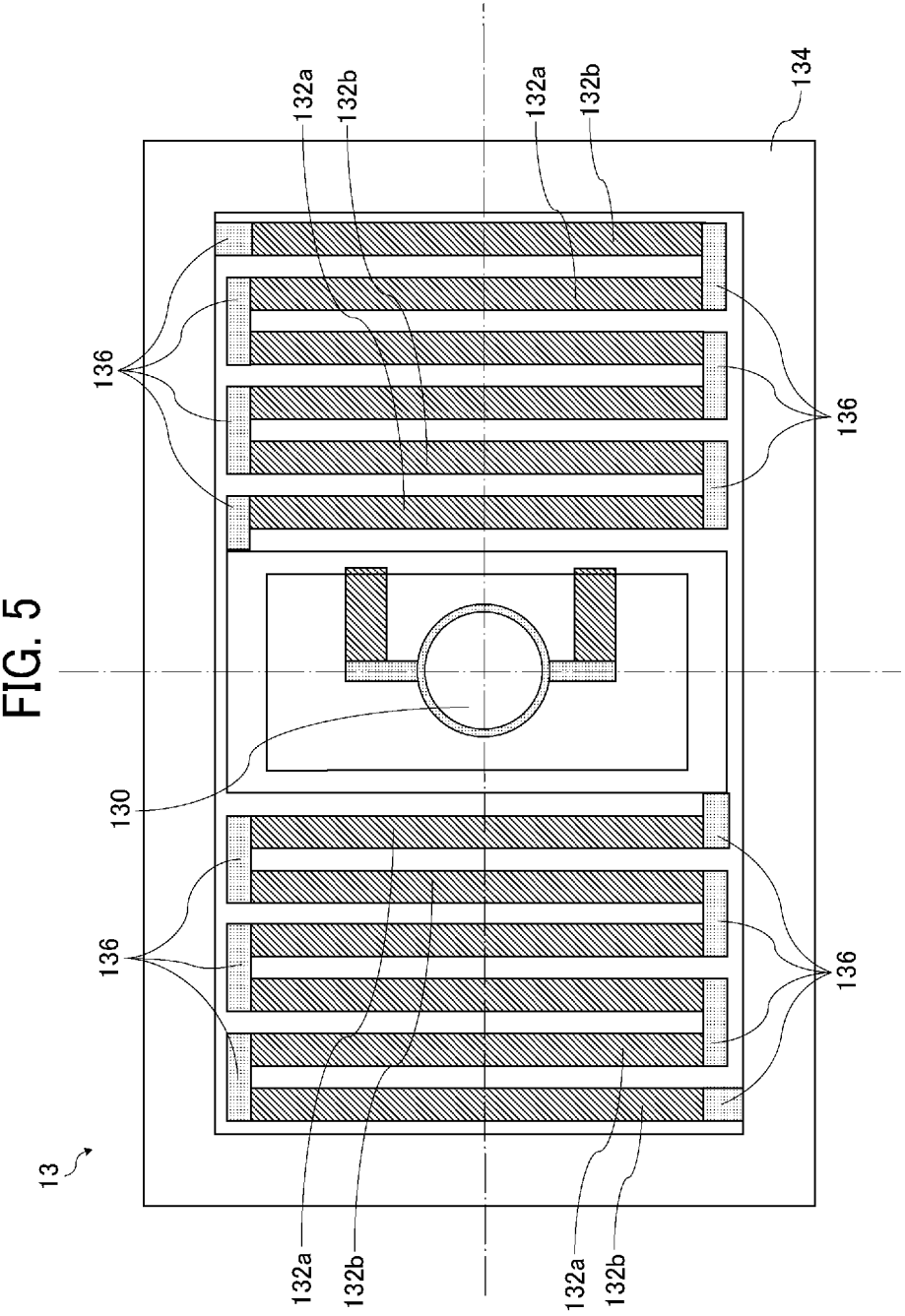
FIG. 5 is a diagram illustrating a specific configuration of a light deflector according to an embodiment of the present disclosure.

FIG. 5 is a diagram illustrating a specific configuration of the light deflector 13 according to the present embodiment. The light deflector 13 is a MEMS mirror produced by semiconductor processing, and includes a mirror 130, a serpentine beam 132, a frame 134, and a piezoelectric member 136. The light deflector 13 is an example of a scanner.

The mirror 130 has a reflection plane that reflects the laser beams emitted from the light-source device 11 towards the screen 15 side. In the light deflector 13, a pair of serpentine beams 132 are formed across the mirror 130. Each of the pair of serpentine beams 132 has a plurality of turning portions. Each of these turning portions is configured by a first beam 132a and a second beam 132b that are arranged alternately.

Each of the pair of serpentine beams 132 is supported by the frame 134. The piezoelectric member 136 is disposed such that the first beam 132a and the second beam 132b, which are adjacent to each other, are coupled to each other. The piezoelectric member 136 applies different levels of voltage to the first beam 132a and the second beam 132b to bend each of the first beam 132a and the second beam 132b differently.

As a result, the first beam 132a and the second beam 132b, which are adjacent to each other, bend in different directions. As the bending force is accumulated, the mirror 130 rotates in the vertical direction around the horizontal axis. Due to such a configuration as above, the light deflector 13 can perform optical scanning in the vertical direction at a low voltage. An optical scanning in the horizontal direction around the axis in the vertical direction is implemented by the resonance produced by a torsion bar or the like coupled to the mirror 130.

Screen

Figure 6:
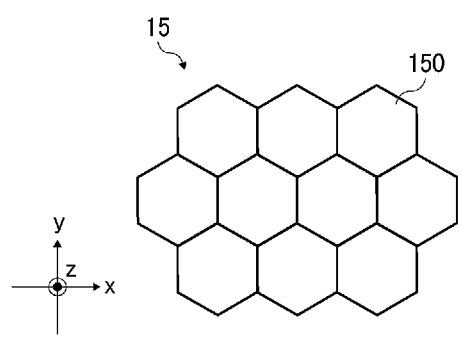
FIG. 6 is a diagram illustrating a specific configuration of a screen according to an embodiment of the present disclosure.

FIG. 6 is a diagram illustrating a specific configuration of the screen 15 according to the present embodiment. The laser beams emitted from the LD 1007 that configures a part of the light-source device 11 form an image on the screen 15. The screen 15 serves as a divergent part that diverges the laser beams at a predetermined divergence angle. The screen 15 as illustrated in FIG. 6 has a microlens-array structure in which a plurality of hexagonal-shaped microlenses 150 are arranged with no gap therebetween. The width of each of the microlenses 150 (the distance between two sides that face each other) is approximately 200 micrometer (m). As the microlenses 150 of the screen 15 have a hexagonal shape, the multiple microlenses 150 can be arrayed with high density.

Note that the shape of each of the microlenses 150 is not limited to a hexagonal shape. For example, in some embodiments, the microlenses 150 have a rectangular shape or a triangular shape. In the present embodiment, structure in which the multiple microlenses 150 are arrayed in a regularized manner is described. However, no limitation is intended thereby, and the arrangement of the microlenses 150 is not limited to this structure. For example, the centers of the multiple microlenses 150 may be decentered from each other, and the microlenses 150 may be arranged in an irregular manner. When such a decentered arrangement is adopted, those multiple microlenses 150 have different shapes from each other.

Figure 7A:
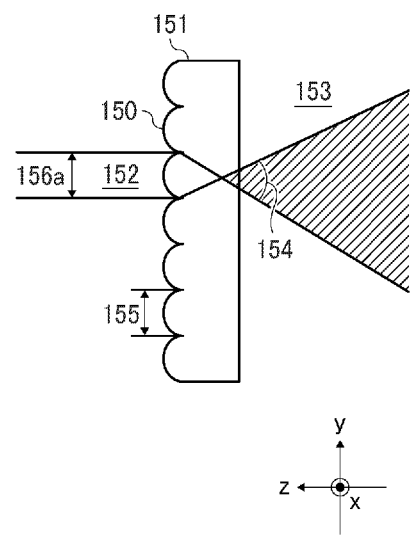
FIG. 7A and FIG. 7B are diagrams illustrating a difference in operation due to differences in sizes of the diameter of incident light flux and the lens diameter in a microlens array, according to an embodiment of the present disclosure.
Figure 7B:
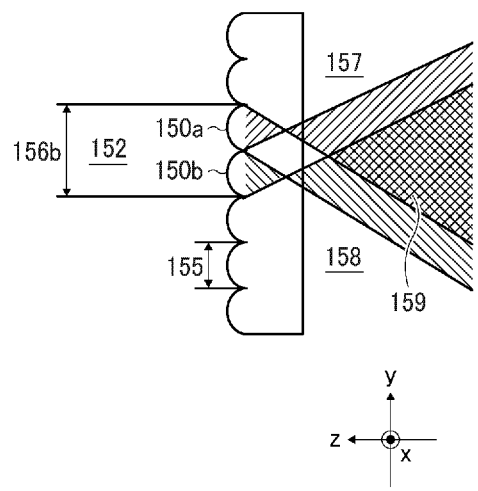

FIG. 7A and FIG. 7B are diagrams illustrating a difference in operation due to differences in sizes of the diameter of incident light flux and the lens diameter in the microlens array, according to the present embodiment. In FIG. 7A, the screen 15 is configured by an optical plate 151 in which the multiple microlenses 150 are neatly arranged. When an incident light 152 is scanned on the optical plate 151, the incident light 152 diverges as passing through the microlenses 150, and the incident light 152 becomes a diverging light 153. Due to the structure of the microlenses 150, the screen 15 can disperse the incident light 152 at a desired divergence angle 154. This divergence angle 154 corresponds to the curvature of the microlens 150. The intervals 155 at which the microlenses 150 are arranged is designed to be wider than the diameter 156a of the incident light 152. Accordingly, the screen 15 does not cause interference among the lenses, and does not cause speckles (speckle noise).

FIG. 7B is a diagram illustrating the optical paths of diverging lights when the diameter 156b of the incident light 152 is twice wider than the intervals 155 at which the microlenses 150 are arranged. The incident light 152 is incident on two microlenses 150a and 150b, and these two microlenses 150a and 150b produce two diverging lights 157 and 158, respectively. In such cases, lights may interfere with each other as two diverging lights exist in an area 159. Such an interference between two diverging lights (coherent light) is visually recognized as a speckle by an observer.

In view of the above circumstances, the intervals 155 at which the microlenses 150 are arranged is designed to be wider than the diameter 156 of the incident light 152 in order to reduce the speckles. A configuration with convex lenses are described as above with reference to FIG. 7A and FIG. 7B. However, no limitation is indicated thereby, and advantageous effects can be expected in a similar manner in a configuration with concave lenses.

Figure 8:
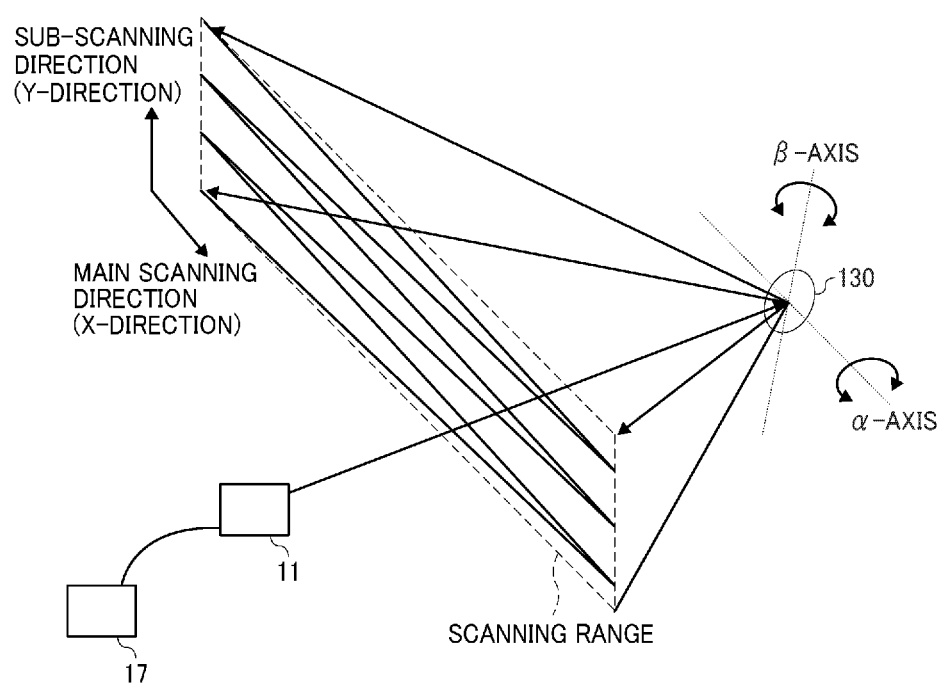
FIG. 8 is a diagram illustrating the relation between a mirror of a light deflector and the scanning range, according to an embodiment of the present disclosure.

FIG. 8 is a diagram illustrating the relation between a mirror of the light deflector 13 and the scanning range, according to the present embodiment. The FPGA 1001 controls the light-emission intensity, the timing of light emission, and the light waveform of the multiple light-source elements in the light-source device 11. The LD driver 1008 drives the multiple light-source elements of the light-source device 11 to emit laser beams. As illustrated in FIG. 8, the laser beams that are emitted from the multiple light-source elements and whose optical paths are combined are two-dimensionally deflected about the α axis and the β axis by the mirror 130 of the light deflector 13, and the screen 15 is irradiated with the laser beams deflected by the mirror 130, which serve as scanning beams. In other words, the screen 15 is two-dimensionally scanned by main scanning and sub-scanning by the light deflector 13.

In the present embodiment, the entire area to be scanned by the light deflector 13 may be referred to as a scanning range. The scanning beams scan (two-way scans) the scanning range of the screen 15 in an oscillating manner in the main scanning direction (X-axis direction) at a high frequency of about 20,000 to 40,000 hertz (Hz), and one-way scan the scanning range of the screen 15 in the sub-scanning direction (Y-axis direction) at a low frequency of about a few tens of Hz. In other words, the light deflector 13 performs raster scanning on the screen 15. In this configuration, the display device 10 controls the light emission of the multiple light-source elements according to the scanning position (the position of the scanning beam). Accordingly, an image can be drawn on a pixel-by-pixel basis and a virtual image can be displayed.

As described above, the sub-scanning cycle is about a few tens of Hz. Accordingly, the length of time to draw an image of one frame, i.e., the length of time to scan one frame (one cycle of two-dimensional scanning) is a few tens of millisecond (msec). For example, assuming that the main-scanning cycle and the sub-scanning cycle are 20,000 Hz and 50 Hz, respectively, the length of time to scan one frame is 20 msec.

Figure 9:
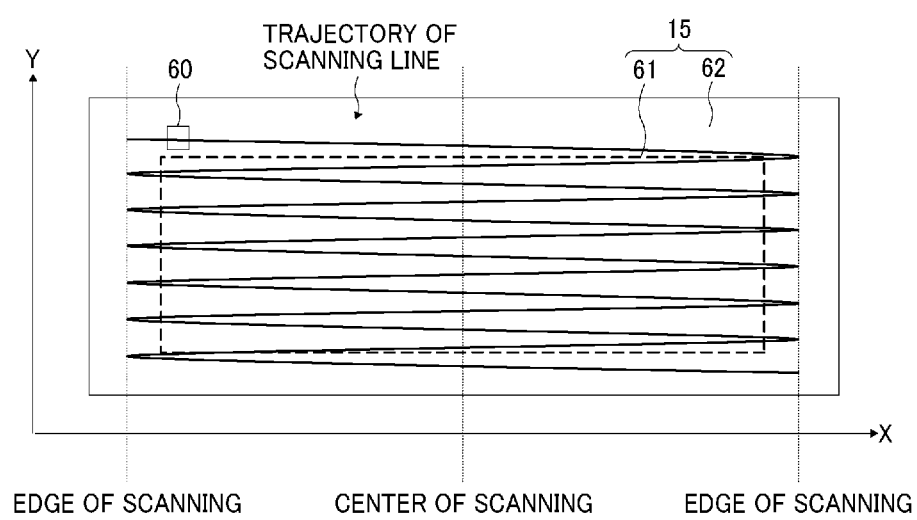
FIG. 9 is a diagram illustrating the trajectory of a scanning line when two-dimensional scanning is performed, according to an embodiment of the present disclosure.

FIG. 9 is a diagram illustrating the trajectory of a scanning line when two-dimensional scanning is performed, according to the present embodiment. As illustrated in FIG. 9, the screen 15 includes an image area 61 (i.e., an effective scanning area) and a frame area 62 that surrounds the image area 61. The image area 61 is irradiated with the light that is modulated according to the image data, and the intermediate image 40 is drawn on the image area 61.

In the present embodiment, the scanning range includes the image area 61 and a part of the frame area 62 (i.e., a portion around the periphery of the image area 61) on the screen 15. In FIG. 9, the trajectory of the scanning line in the scanning range is indicated by a zigzag line. For the sake of explanatory convenience, the number of scanning lines in FIG. 9 is less than the actual number of scanning lines.

For example, the screen 15 may be configured by a transmissive optical element such as a microlens array that diffuses light. In the present embodiment, the shape of the image area 61 is rectangular or planar. However, no limitation is intended thereby, and the shape of the image area 61 may be polygonal or curved. Alternatively, in some embodiments, the screen 15 may be a flat plate or curved plate that does not diffuse light. Further, in some embodiments, the image area 61 may be a reflective element such as a micromirror array that diffuses light, depending on the design or layout of the display device 10.

The screen 15 is provided with a synchronous detection system 60 that includes a light receiver disposed at the edges of the image area 61 (a portion of the frame area 62) in the scanning range. In FIG. 9, the synchronous detection system 60 is disposed on the −X and +Y side of the image area 61. More specifically, the synchronous detection system 60 is disposed at a corner on the +Y side. The synchronous detection system 60 detects the operation of the light deflector 13 and outputs, to the FPGA 1001, a synchronizing signal that determines the start timing of scanning or the end timing of scanning.

The optical design of the display system 1 according to the present embodiment is described below with reference to FIG. 10 to FIG. 12.

Figure 10:
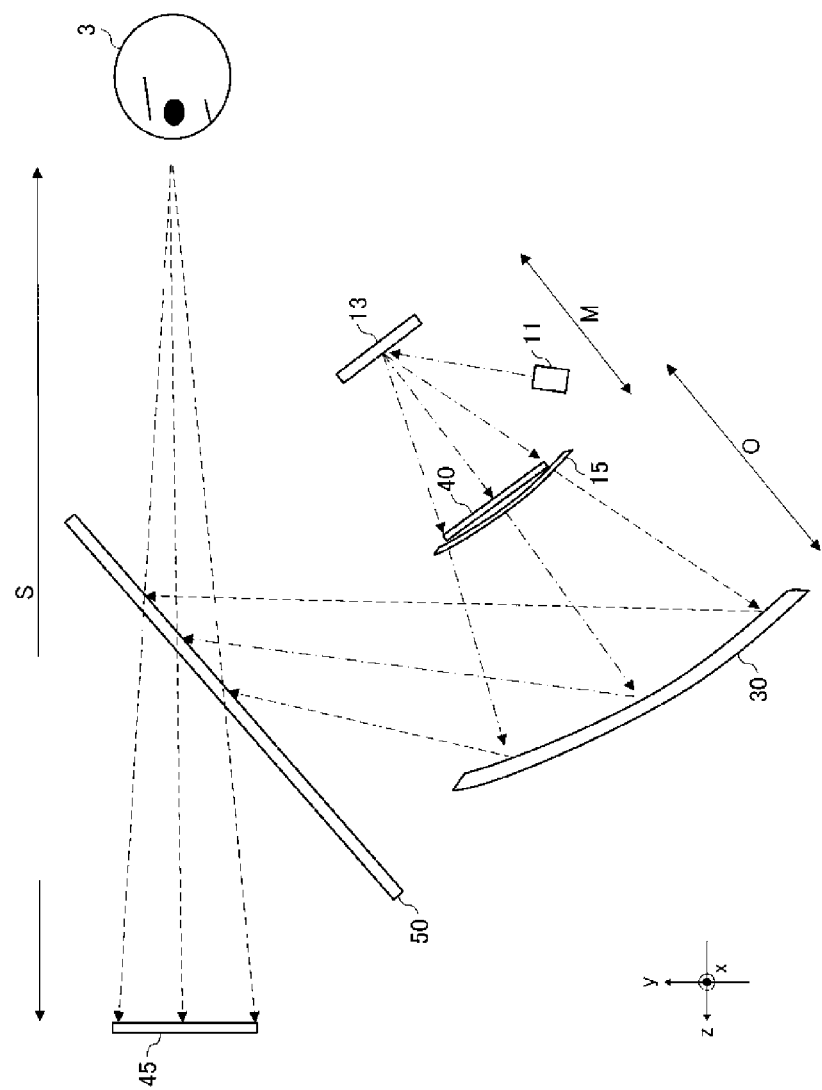
FIG. 10 is a schematic diagram illustrating the optical-path length in a display system according to an embodiment of the present disclosure.

FIG. 10 is a schematic diagram illustrating the optical-path length in the display system 1 according to the present embodiment. In the present embodiment, each optical path length in the multiple elements of the display system 1 is measured using the path of the light that passes through the center of the image when an object is observed from the center of an eyelips (reference eyepoint). In the present embodiment, it is assumed that the center of the image matches the geometric center in each of the elements. Note that the center of an eyelips (reference eyepoint) indicates the reference location of the eyepoint of the viewer 3, and indicates the center of an eye box, which is an area through which the viewer 3 can visually recognize a formed image.

The viewer 3 (for example, the driver who drives a vehicle) visually recognizes the virtual image 45 from an eye box (i.e., an area near the eyes of the viewer 3) in the optical path of the light that is reflected by the front windshield 50. Here, the term "eye box" indicates the area in which the viewer 3 can visually recognize the virtual image 45 as the location of the eyepoint is adjusted. In particular, the range of the eye box is equal to or less than "the eye range of a car driver" (Japanese Industrial Standards (JIS) D 0021). The eye box is set as the area through which the driver can visually recognize the virtual image 45, based on the eyelips that is a region of space in which the eyepoint of the driver seated on a seat can exist.

In the display system 1, the optical path length between the reference eyepoint of the viewer 3 and the center of the virtual image 45 is defined as optical path length S.

The optical path length between the light deflector 13 and the center of the intermediate image 40 formed on the screen 15 is defined as optical path length M. The optical-path length between the center of the intermediate image 40 formed on the screen 15 and the center of the area where the bundles of laser beams diverging through the intermediate image 40 pass through the free-form surface mirror 30 is defined as optical path length O.

Figure 11:
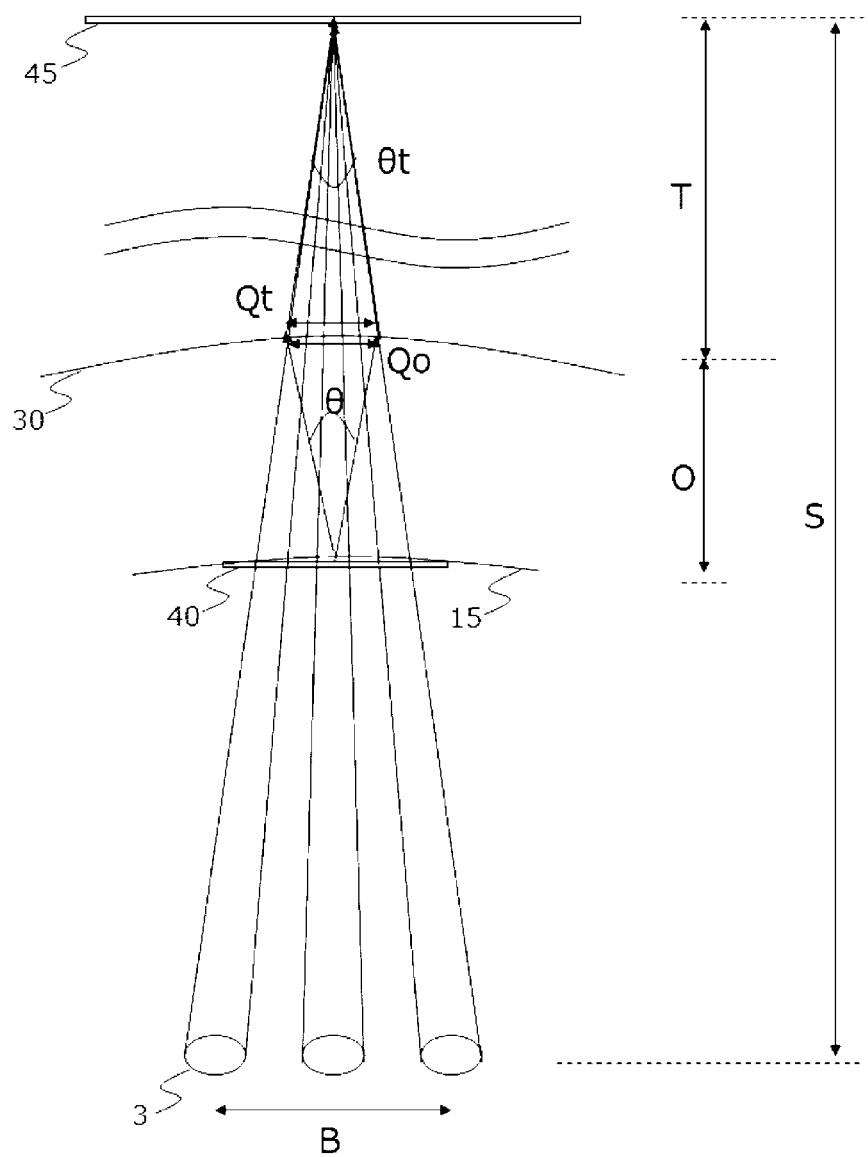
FIG. 11 is a schematic diagram illustrating the relative positions of the elements in a display system according to an embodiment of the present disclosure.

FIG. 11 is a schematic diagram illustrating the relative positions of the elements in the display system 1 according to the present embodiment. For the sake of explanatory convenience, it is assumed in FIG. 11 that the elements of the system are arranged in parallel on the XZ plane. However, no limitation is indicated thereby, and in actuality, it is not necessary for the elements of the system to be arranged parallel to the XY plane as illustrated in FIG. 10.

Further, the optical-path length between the center of the area where the bundles of laser beams diverging through the intermediate image 40 pass through the free-form surface mirror 30 and the center of the virtual image 45 is defined as an optical path length T.

As described above, the screen 15 is provided with a light dispersing member such as a microlens array, and in the present embodiment, the microlens array makes up the screen 15. The bundles of laser beams that scan the screen 15 diverge at a predetermined divergence angle θ as passing through the screen 15. The bundles of laser beams that are emitted from the screen 15 are incident on the free-form surface mirror 30. Qo denotes the band pass of the bundles of laser beams on the free-form surface mirror 30.

The plane of the free-form surface mirror 30 is designed and shaped so as to reduce the optical strain that occurs on the front windshield 50 as illustrated in FIG. 10. The bundles of laser beams that have passed through the free-form surface mirror 30 are then incident on the front windshield 50, and reach at least one point of the location of the eyepoint within an eyelips area including the reference eyepoint of the viewer 3. The bundles of laser beams that are incident on the front windshield 50 are reflected according to the shape of the surface of the front windshield 50.

"B" indicates the range of the eye box that is an area through which a formed image can visually be recognized, and the viewer 3 can visually recognize a virtual image, which is formed by the free-form surface mirror 30, within the range B of the eye box. In FIG. 11, θt indicates the angle that the lines that connect the virtual image and the range B of the eye box form, and Qt indicates the area where the lines that connect the virtual image and the range B of the eye box intersect with the free-form surface mirror 30.

Preferably, the display system 1 is configured such that area Qo≥area Qt. If area Qo<area Qt, the light intensity is insufficient at edges of the area Qo, and the brightness is also insufficient when a virtual image is viewed from a viewpoint at an edge of the range B of the eye box. By contrast, when area Qo≥area Qt, the light intensity is sufficient even at edges of the area Qo, and the brightness is sufficient even when a virtual image is viewed from a viewpoint at an edge of the range B of the eye box.

In FIG. 11, Qo, Qt, and B are defined by a second equation, a third equation, and a fourth equation, respectively.

$$Qo = O \times \tan\theta \qquad \text{Second Equation}$$

$$Qt = T \times \tan\theta t \qquad \text{Third Equation}$$

$$B = S \times \tan\theta t \qquad \text{Fourth Equation}$$

When the relational expression Qo≥Qt is transformed based on the second to fourth equations, the condition in a first equation given below is derived. In other words, in the display system 1, variations in brightness when the viewer moves his/her location of the eyepoint can be reduced by satisfying the condition in the first equation given below. In particular, the brightness is sufficient even when the viewer 3 views a virtual image from a viewpoint at an edge of the range B of the eye box.

$$\tan\theta \geq (T \times B)/(S \times O) \qquad \text{First Equation}$$

Figure 12:
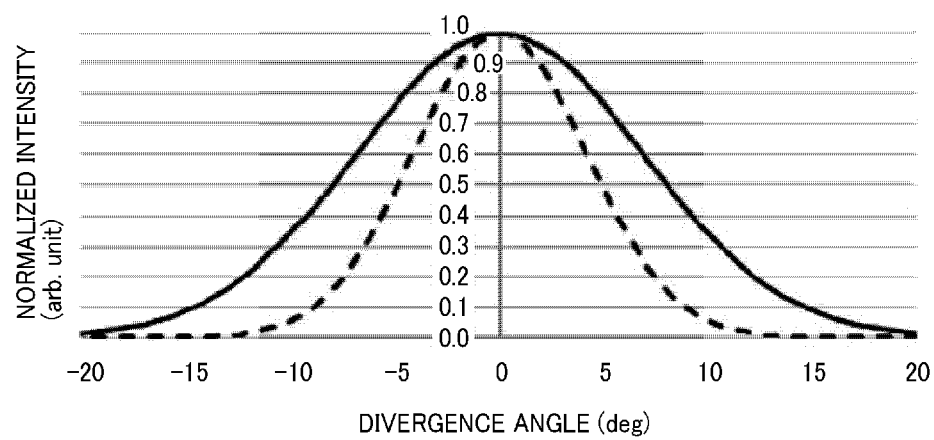
FIG. 12 is a diagram illustrating the relation between the divergence angle of the light diverging through a screen and the intensity, according to an embodiment of the present disclosure.

FIG. 12 is a diagram illustrating the relation between the divergence angle of the light diverging through the screen 15 and the intensity, according to the present embodiment. The horizontal axis in FIG. 12 indicates the divergence angle Δθ of the diverging light on the screen 15 with reference to the bundles of laser beams incident on the screen 15. As illustrated in FIG. 12, the normalized intensity with reference to the divergence angle Δθ has an intensity profile of the Gaussian distribution specific to laser beams. In the present embodiment, the divergence angle Δθ indicates the difference in angle between the incident angle at which the light beam is incident on the screen 15 and the center point of the divergence angle of the diverging light that reaches the location of the eyepoint of the viewer 3 as the incident light is dispersed by the screen 15.

The solid line drawn in FIG. 12 indicates the present embodiment where tan θ≥TB/SO is satisfied, and the broken lines drawn in FIG. 12 indicate a control sample where tan θ≥TB/SO is not satisfied (tan θ<TB/SO). It is understood from FIG. 12 that the normalized intensity gradually in the present embodiment decreases as the divergence angle increases, compared with the control sample. Due to this configuration, the brightness in the present embodiment is sufficient even when the viewer 3 views a virtual image from an area with a large divergence angle, i.e., a viewpoint at an edge of the range B of the eye box. As described above, in the present embodiment, variations in brightness when the viewer moves his/her location of the eyepoint can be reduced.

Figure 13:
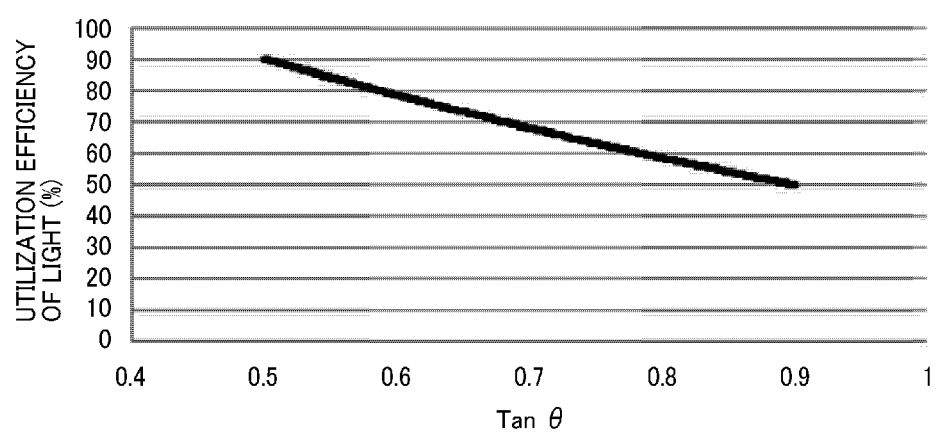
FIG. 13 is a diagram illustrating the relation between the divergence angle of the light diverging through a screen and the utilization efficiency of light, according to an embodiment of the present disclosure.

FIG. 13 is a diagram illustrating the relation between the divergence angle of the light diverging through the screen 15 and the utilization efficiency of light, according to the present embodiment. The horizontal axis in FIG. 13 indicates the value of tan θ based on the divergence angle Δθ of the divergence angle of the diverging light on the screen 15 with reference to the bundles of laser beams incident on the screen 15, and the vertical axis indicates the utilization efficiency of the entire diverging light. In the present embodiment, preferably, the utilization efficiency of the entire diverging light is equal to or greater than 50%, and tan θ is equal to or less than 0.9, accordingly.

As described above with reference to FIG. 7A and FIG. 7B, the divergence angle Δθ corresponds to the curvature of the microlens 150 in the present embodiment. More specifically, the curvature of the microlens 150 is determined by the angle of view, the resolution, the refractive index, and the size of the screen 15 in addition to the divergence angle Δθ. When the microlenses 150 are arranged such that "O" that indicates the distance between the microlenses 150 and the image forming optical system becomes 150 to 500 millimeters (mm), preferably, the curvature of the microlenses is 31 to 554 micrometers (m). Moreover, preferably, the length in the main scanning direction is 84 to 126 μm, and the resolution is 50 to 150 pixel/degree (ppd). Due to this configuration, in the display system 1, the condition in 0.9≥tan θ≥TB/SO can easily be satisfied.

Figure 14:
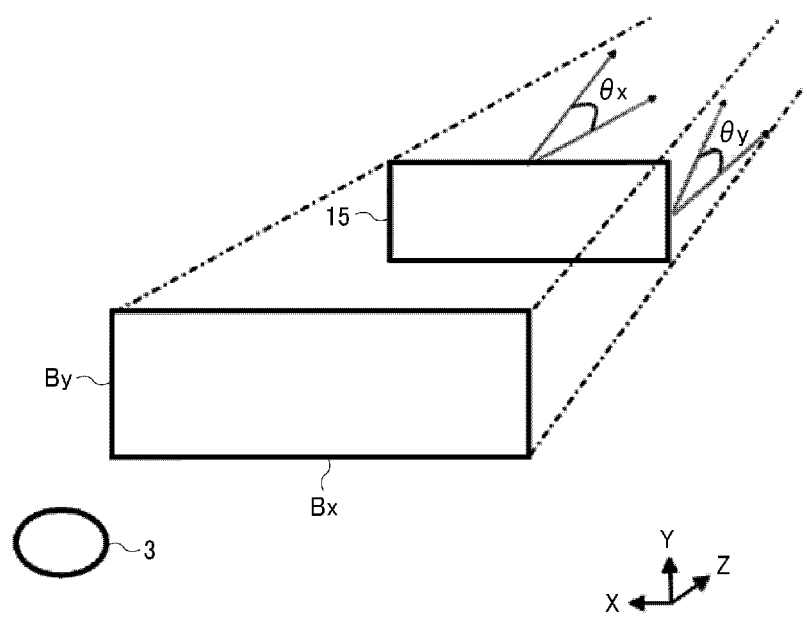
FIG. 14 is a diagram illustrating the relation between the direction of an eye box and the directions of divergence angles, according to an embodiment of the present disclosure.

FIG. 14 is a diagram illustrating the relation between the direction of an eye box and the directions of divergence angles, according to an embodiment of the present disclosure. The range B of an eye box, which is an area through which a formed image can visually be recognized, has a rectangular shape virtualized in front of the eyes of the viewer 3, where Bx denotes the range of the eye box in the main scanning direction (i.e., the X-axis direction) and By denotes the range of the eye box in the sub-scanning direction (i.e., the Y-axis direction). The divergence angle θ of the diverging light on the screen 15 includes θX that indicates the divergence angle in the main scanning direction (i.e., the X-axis direction) and θY that indicates the divergence angle in the sub-scanning direction (i.e., the Y-axis direction).

In the present embodiment, Bx that indicates the range of the eye box in the main scanning direction (i.e., the X-axis direction) is greater than By that indicates the range of the eye box in the sub-scanning direction (i.e., the Y-axis direction), and θX that indicates the divergence angle of the screen 15 in the main scanning direction (i.e., the X-axis direction) is greater than θY that indicates the divergence angle of the screen 15 in the sub-scanning direction (i.e., the Y-axis direction). The XYZ axes may be changed in view of the layout when implemented in a vehicle.

As described above, the display system 1 according to an embodiment of the present disclosure is a laser-scanning display system provided with the screen 15 that serves as an optical element through which light diverges. However, no limitation is indicated thereby, and the embodiment of the present disclosure may be applied to a "panel" display system provided with a liquid crystal panel as an optical element through which light diverges.

When the permissible ranges of the values for Δθ and other parameters in view of the layout of each optical system are taken in consideration, preferably, the optical-path length M between the light deflector 13 and the center of the intermediate image 40 is around 80 to 120 mm. The display device 10 uses such a value for M to calculate and obtain the other parameters. Accordingly, optimal optical design of the display device 10 is enabled.

In the display system 1, the free-form surface mirror 30 is the only reflector. However, no limitation is intended thereby. For example, when a plurality of optical elements are used in the display system 1, the condition in the first equation may be satisfied in terms of a system configured by each one of the elements.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

The present disclosure can be implemented in any convenient form, for example using dedicated hardware, or a mixture of dedicated hardware and software. The present disclosure may be implemented as computer software implemented by one or more networked processing apparatuses. The processing apparatuses can compromise any suitably programmed apparatuses such as a general purpose computer, personal digital assistant, mobile telephone (such as a WAP or 3G-compliant phone) and so on. Since the present disclosure can be implemented as software, each and every aspect of the present disclosure thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to 35 U.S.C. § 119(a) to Japanese Patent Application No. 2018-092842, filed on May 14, 2018, in the Japan Patent Office, the entire disclosure of which is hereby incorporated by reference herein.

REFERENCE SINGS LIST

1A Display system
10 Display device
11 Light-source device (an example of a light source)
13 Light deflector
15 Screen (an example of an optical element)
30 Free-form surface mirror
50 Front windshield (an example of a reflector)

The invention claimed is:

1. A display system comprising:
an optical structure through which light diverges; and
an imaging optical structure to form an image by projecting diverging light diverging through the optical structure,
wherein the image formed by the imaging optical structure is visually recognized by a viewer,
wherein a condition in an equation $\tan \theta \geq (T \times B)/(S \times O)$ is satisfied,
where
θ denotes a divergence angle of the optical structure,
T denotes a distance between the imaging optical structure and the formed image,
B denotes a range of an eye box that is an area through which the formed image is visually recognized,
S denotes a distance between the formed image and a viewpoint of the viewer of the formed image, and
O denotes a distance between the optical structure and the imaging optical structure, and
wherein each distance indicates length of an optical path that passes through a center of an image formed by the light when an object is observed from a reference eyepoint.

2. The display system according to claim 1, wherein the $\tan \theta$ is equal to or less than 0.9.

3. The display system according to claim 1, further comprising a light deflector to scan light emitted from a light source in a main scanning direction and a sub-scanning direction orthogonal to the main scanning direction to form an intermediate image on the optical structure.

4. The display system according to claim 3,
wherein a condition in an equation Bx>By is satisfied,
where
Bx denotes a range of the eye box in the main scanning direction, and
By denotes a range of the eye box in the sub-scanning direction, and wherein a condition in an equation θX>θY is satisfied,
where
θX denotes a divergence angle of the optical structure in the main scanning direction, and
θY denotes a divergence angle of the optical structure in the sub-scanning direction.

5. The display system according to claim 1, wherein the optical structure is a microlens array in which a plurality of microlenses are arranged in an array.

6. The display system according to claim 5,
wherein the microlens array is disposed to make the distance O between the optical structure and the imaging optical structure become 150 to 500 mm, and
wherein each of the plurality of microlens has curvature of 31 to 554 µm.

7. The display system according to claim 1, further comprising
a reflector to reflect the diverging light diverging through the optical structure element,
wherein the imaging optical structure projects the diverging light diverging through the optical structure towards the reflector to form a virtual image.

8. A mobile object comprising the display system according to claim 7, wherein the reflector is a front windshield to reflect the diverging light.

9. An optical structure, used for a display system comprising the optical structure through which light diverges and an imaging optical structure to form an image by projecting diverging light diverging through the optical structure, wherein the image formed by the imaging optical structure is visually recognized by a viewer,
wherein a condition in an equation $\tan \theta \geq (T \times B)/(S \times O)$ is satisfied,
where
θ denotes a divergence angle of the optical structure,
T denotes a distance between the imaging optical structure and the formed image,
B denotes a range of an eye box that is an area through which the formed image is visually recognized,
S denotes a distance between the formed image and a viewpoint of the viewer of the formed image, and
O denotes a distance between the optical structure and the imaging optical structure, and
wherein each distance indicates length of an optical path that passes through a center of an image formed by the light when an object is observed from a reference eyepoint.

\* \* \* \* \*